United States Patent [19]

Zetterberg et al.

[11] Patent Number: 4,567,554
[45] Date of Patent: Jan. 28, 1986

[54] STATIC CONVERTOR MEANS

[75] Inventors: Gunnar Zetterberg, Västerås; Lennart Ängquist, Enköping, both of Sweden

[73] Assignee: ASEA Aktiebolag, Västerås, Sweden

[21] Appl. No.: 503,115

[22] Filed: Jun. 10, 1983

[30] Foreign Application Priority Data

Jun. 23, 1982 [SE] Sweden .................................. 8203898

[51] Int. Cl.[4] ............................................. H02M 1/06
[52] U.S. Cl. ....................................... 363/138; 363/37
[58] Field of Search ...................... 363/34, 37, 57, 135, 363/136, 137, 138, 51

[56] References Cited

U.S. PATENT DOCUMENTS

| 3,707,668 | 12/1972 | Johnston | 363/137 |
| 3,746,963 | 7/1973 | VeNard | 363/48 |

FOREIGN PATENT DOCUMENTS

| 2510357 | 3/1975 | Fed. Rep. of Germany | 363/138 |
| 53-91328 | 11/1978 | Japan | 363/55 |
| 5332758 | 10/1981 | Japan | 363/54 |
| 58-66583 | 4/1983 | Japan | 363/37 |
| 2026263 | 1/1980 | United Kingdom | 363/137 |
| 511658 | 9/1976 | U.S.S.R. | 363/138 |
| 551780 | 6/1977 | U.S.S.R. | 363/138 |
| 881953 | 11/1981 | U.S.S.R. | 363/136 |

*Primary Examiner*—Peter S. Wong
*Assistant Examiner*—Judson H. Jones
*Attorney, Agent, or Firm*—Pollock, Vande Sande & Priddy

[57] ABSTRACT

A static convertor with forced commutation has at least one phase group connected between two busbars. The or each phase group has two series-connected branches with the point of connection therebetween constituting a phase terminal of the group. To the busbars there is connected a commutating circuit comprising commutating thyristors, commutating capacitors and commutating inductors common to the phase group(s). A two-terminal network, having inductive impedance at least at higher frequencies, is connected directly to the busbars and in operation a power flow between the two-terminal network and the convertor takes place. Since the network is connected directly to the busbars, the power flow does not pass through the commutating inductors and the convertor losses are minimized.

5 Claims, 7 Drawing Figures

STATIC CONVERTOR MEANS

BACKGROUND OF THE INVENTION

1. Field of the Invention

This invention relates to a static convertor means of the kind comprising a d.c. voltage capacitor, a static convertor including at least one phase group with forced commutation connected between two busbars and two commutating inductors, common to the at least one phase group, connected between the d.c. voltage capacitor and respective ones of the busbars, each phase group having two series-connected branch portions, the point of connection therebetween constituting a phase terminal of the group, each branch portion comprising a semiconductor means which is controllable in one direction and conducting in the other direction, and a two-terminal network with an impedance which is inductive at higher frequencies, said network being connected to the convertor for transporting energy between the two-terminal network and the convertor. Hereinafter such a convertor means will be referred to as a "convertor means of the kind referred to".

2. Description of the Prior Art

A previously known convertor means of the kind referred to is shown in FIG. 1. In this known convertor means the convertor (SR1) is a three-phase self-commutated inverter and has two busbars (P, N) between which the three phase groups are connected. Each phase group consists of a series connection of two bridge branch portions (e.g. TR1, DR1 and TR2, DR2, respectively), each branch portion consisting of a thyristor and a diode connected in anti-parallel with the thyristor. The phase group for phase R thus consists of the thyristors TR1, TR2 and the diodes DR1, DR2. The connection point of the bridge branch portions constitutes phase terminal R of the inverter. The phase groups for phases S and T are identical with the phase group for phase R. The inverter has a common commutating circuit which comprises commutating capacitors CK1, CK2 and commutating inductors LK1, LK2, the two capacitors CK1, CK2 being connected in series with each other between d.c. voltage terminals PD and ND of the bridge. Each one of the commutating inductors LK1, LK2 is connected between a respective one of the busbars P and N and a respective one of the d.c. voltage terminals PD and ND of the inverter. Each phase group has two antiparallel-connected commutating thyristors, which are connected between the connection point of the commutating capacitors and the phase terminal of the phase group. The commutating thyristors for the phase group R are designated KR1 and KR2, and the commutating thyristors for the other two phase groups are designated in a corresponding way. The commutating thyristors are controlled in a manner known per se so that recharge of the commutating capacitors and extinction of the thyristors of each phase group can be achieved at the desired times during each period. The inverter is controlled in such a manner, known per se, that each phase group delivers a rectangular voltage on its phase terminal with a duration of 180°. The three phase groups are controlled with a mutual phase displacement of 120°. In a manner known per se, the voltage of each phase group can possibly be controlled to the desired amplitude and/or to approximate more closely to a sinusoidal form by being pulse-width modulated with the aid of additional commutations within each half-period.

In the known convertor means of the kind referred to and shown in FIG. 1, a d.c. voltage capacitor CD is connected between the d.c. voltage connections PD and ND of the inverter and constitutes a smoothing capacitor for the intermediate link d.c. voltage.

A two-terminal network TP with inductive impedance is formed by a diode rectifier bridge DB which has a smoothing inductor LD on its d.c. side. The a.c. voltage connections of the diode bridge are intended for connection to a three-phase a.c. voltage network (not shown). The connection points A and B of the two-terminal network are connected to the d.c. voltage connections PD and ND of the inverter. Alternatively, of course, the diode bridge DB may be a single-phase bridge or be replaced by a single-phase or multi-phase thyristor convertor or other d.c. voltage source.

In known convertor means of the kind referred to and as shown in FIG. 1, a major proportion of the losses occur in the commutating inductors LK1 and LK2.

FIG. 1A shows representative curve shapes for the convertor means shown in FIG. 1 during no load operation. The curves designated R, S and T show the control orders to the control pulse device during one period. The remaining curves show the currents and/or voltages appearing at various other parts of the circuit of the convertor means. Upon an order for changing a phase (e.g. R), a reversal of the polarity of the capacitor voltage is initiated by a turn-off thyristor (KR1, KR2) being supplied with a control pulse. A current arises through the diode, which is connected in antiparallel with the main thyristor which is to be extinguished, whereby this thyristor recovers, that is, resumes its off-state voltage capacity. The reversal is completed by the other main thyristor in the same phase being given a firing pulse, whereby a second current pulse occurs, so that the capacitor is made ready to carry out the next commutation.

SUMMARY OF THE INVENTION

The present invention aims to provide a convertor means of the kind referred to which has considerably lower losses than previously known convertor means of the kind referred to.

According to the present invention a convertor means of the kind referred to is characterized in that the two-terminal network is connected directly to the busbars of the convertor.

Preferably the convertor has at least two phase groups connected between the busbars in parallel to each other.

BRIEF DESCRIPTION OF THE DRAWINGS

Embodiments of the invention will now be described in greater detail and by way of example with reference to the accompanying drawings, in which:

FIG. 1 shows a prior art convertor means of the kind referred to;

DESCRIPTION OF THE PREFERRED EMBODIMENTS

Figure 1:
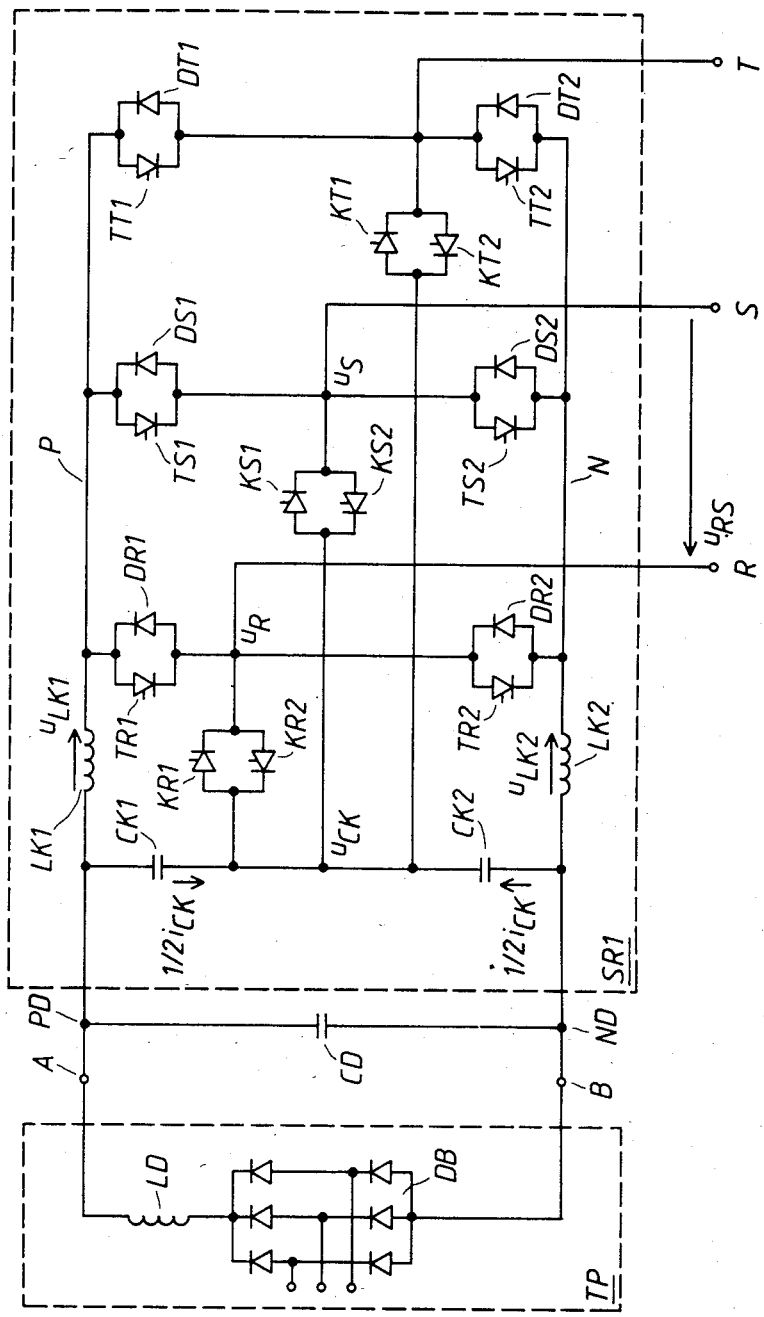
Figure 1A:
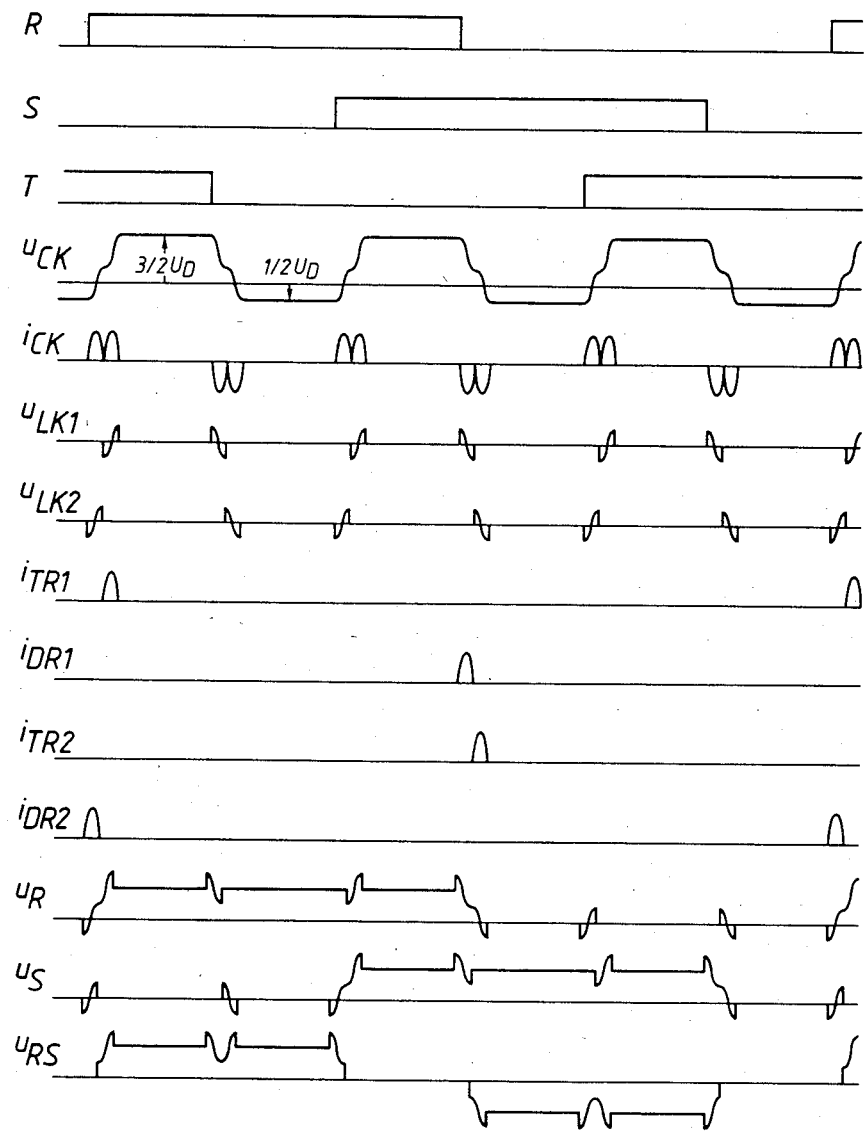
FIG. 1A shows representative waveforms and curve shapes for the prior art convertor means shown in FIG. 1.
Figure 2:
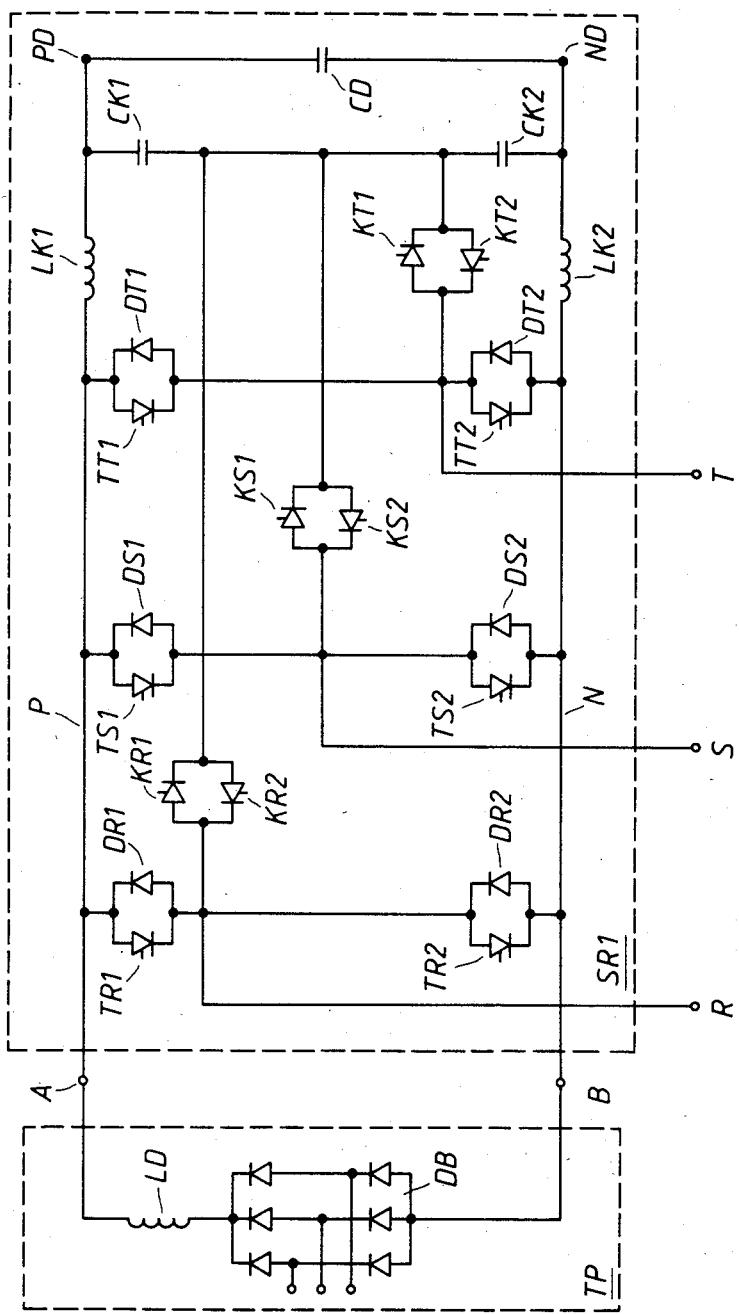
FIG. 2 shows one embodiment of a convertor means according to the invention.

FIG. 2 shows convertor means according to the invention including an inverter of the kind shown in FIG. 1. The same components of the two convertor means shown in FIGS. 1 and 2 have been designated where possible with the same references. In the convertor means according to the invention shown in FIG. 2, the terminals A and B of the two-pole network TP, which consists of the rectifier bridge DB with the smoothing inductor LD, are connected directly to the two busbars P and N of the inverter SR1. The commutating circuit with the inductors LK1 and LK2 and the capacitors CK1 and CK2 are therefore connected to the busbars P and N in parallel with the two-pole network TP. The control and functioning of the convertor means are the same as in the connection shown in FIG. 1. In the convertor means according to FIG. 2, the essential advantage is obtained that the load current of the convertor means will not traverse the commutating inductors LK1 and LK2. This results in a considerable reduction in losses as compared with the known convertor means shown in FIG. 1 and, accordingly, has great economical and practical importance.

Figure 3:
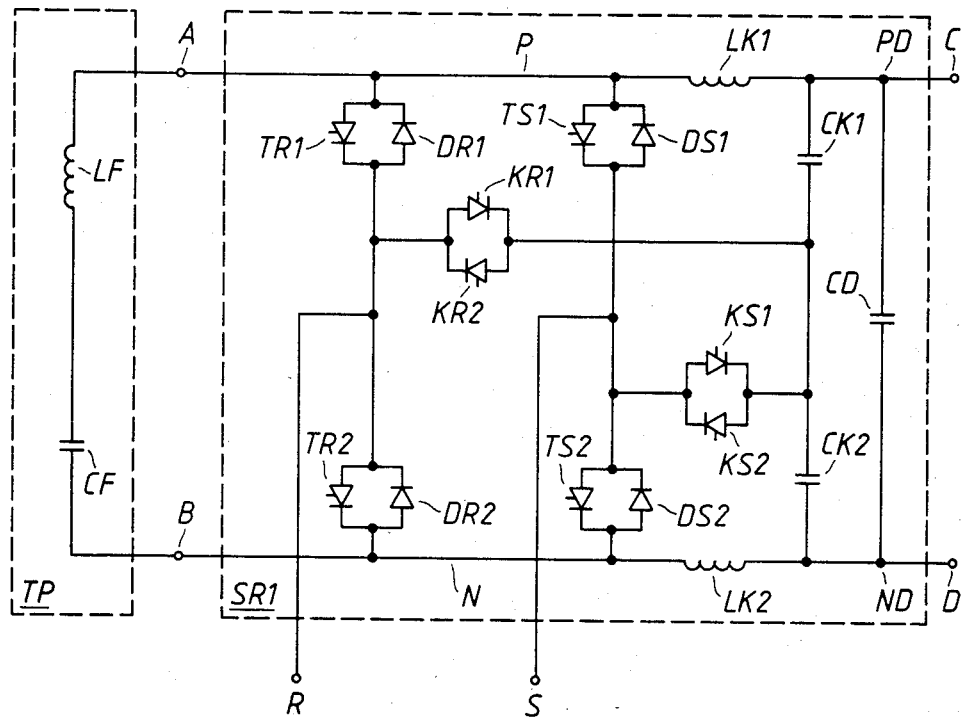
FIG. 3 shows another embodiment of a convertor means according to the invention and in particular shows a so-called mains convertor, for example an asynchronous motor locomotive.

FIG. 3 shows the invention as applied to a so-called mains convertor, for example for asynchronous motor locomotives or other motor drives. The convertor SR1 has two phase groups, but is otherwise constructed in the same way and has the same components as the inverters shown in FIGS. 1 and 2. Where possible components similar to those shown in the convertor means of FIGS. 1 and 2 have been designated with the same references. The two phase terminals R and S are intended for connection to a single-phase a.c. network, for example a railway supply network having a frequency of 16½ Hz. Furthermore, the convertor has two d.c. terminals C and D, to which there can be connected, for example, an inverter for supply of an asynchronous motor having variable frequency. In the case of single-phase convertors of this kind, an a.c. component with a high amplitude will arise on the d.c. side, which a.c. component—in prior art convertors—has traversed the commutating inductances and given rise to high losses therein. In the d.c. link, that is, between the terminals C and D, a series filter, tuned to twice the frequency of the alternating voltage network, has been connected.

According to the invention, the tuned series filter, consisting of a filter inductor LF and a filter capacitor CF, is now connected directly to the busbars P and N of the convertor SR1. The series filter LFCF thus constitutes a two-terminal network TP between the terminals A and B, which terminals A, B are directly connected to the busbars P and N. Between this two-terminal network TP and the convertor busbars P, N there flows an alternating current with an amplitude which is of the same order of magnitude as the load current of the convertor. In the convertor means now described according to the invention, this alternating current will not traverse the commutating inductors, which are thus only traversed by the d.c. component of the load current of the convertor. This results in a considerable reduction of the losses in the inductors and thereby a considerable reduction of the total losses of the convertor means.

Figure 4:
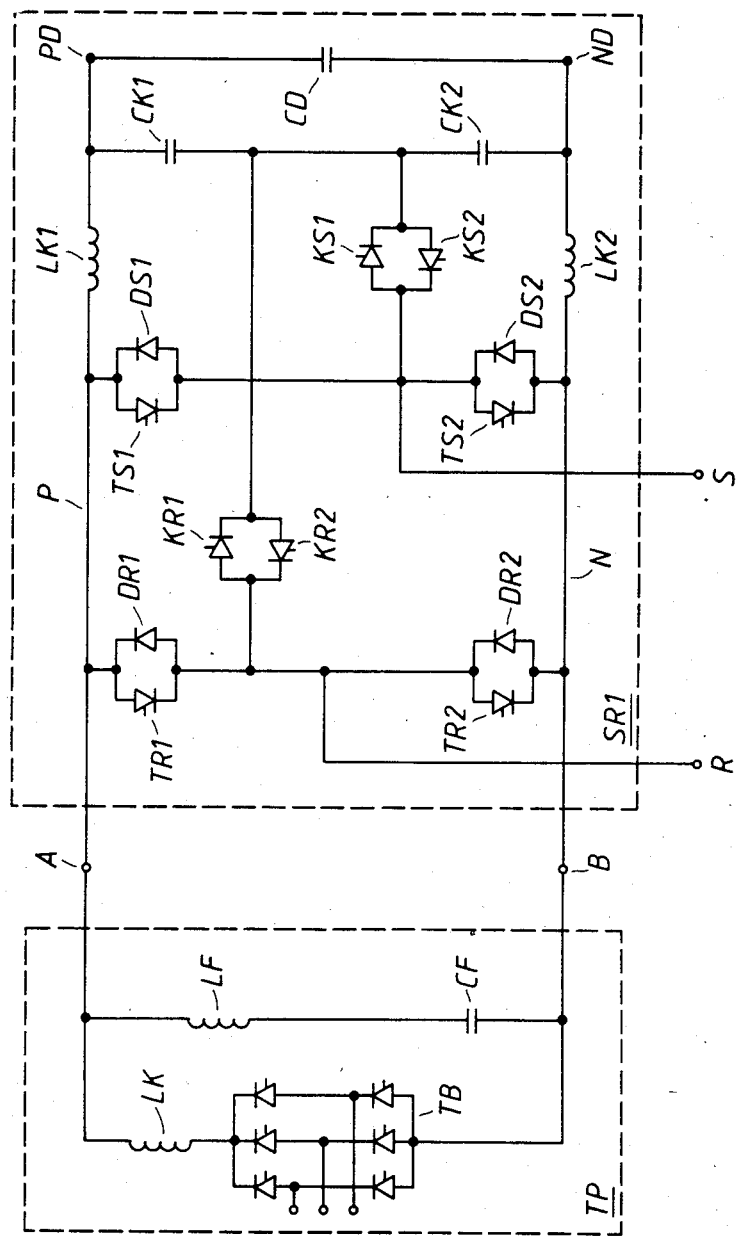
FIG. 4 shows another embodiment of a convertor means according to the invention and in particular shows a frequency convertor for feeding a single-phase network.

FIG. 4 shows a frequency convertor according to the invention. Once again the same references have been used to designate similar components identified in the previous Figures. The two-terminal network TP in this case comprises a thyristor convertor bridge TP with a smoothing inductor LK. The a.c. voltage connections of the bridge are intended for connection to a multiphase a.c. network, for example having a frequency of 50 Hz. The convertor SR1 is a single-phase convertor with forced commutation, which is built up in a manner identical with that of the convertor SR1 shown in FIG. 3. The phase terminals R and S of the convertor SR1 are intended for connection to a single-phase a.c. voltage network, for example a railway supply network having a frequency of 16⅔ Hz. Since the convertor SR1 is a single-phase convertor, there will arise considerable power pulsations having a frequency which is twice the frequency of the single-phase a.c. voltage network (33 Hz) connected to the terminals R and S. The a.c. component with a high amplitude, caused by these power pulsations, is taken care of by the series filter consisting of the inductor LF and the capacitor CF and tuned to 33 Hz, said series filter being shown as included in the two-terminal network TP. In this case the invention implies that neither the load current of the convertor nor the a.c. component with a high amplitude flowing between the filter and the bus-bars P and N will traverse the commutating inductors LK1 and LK2. Therefore, also in this case the invention results in a considerable reduction of the losses of the device.

Figure 5:
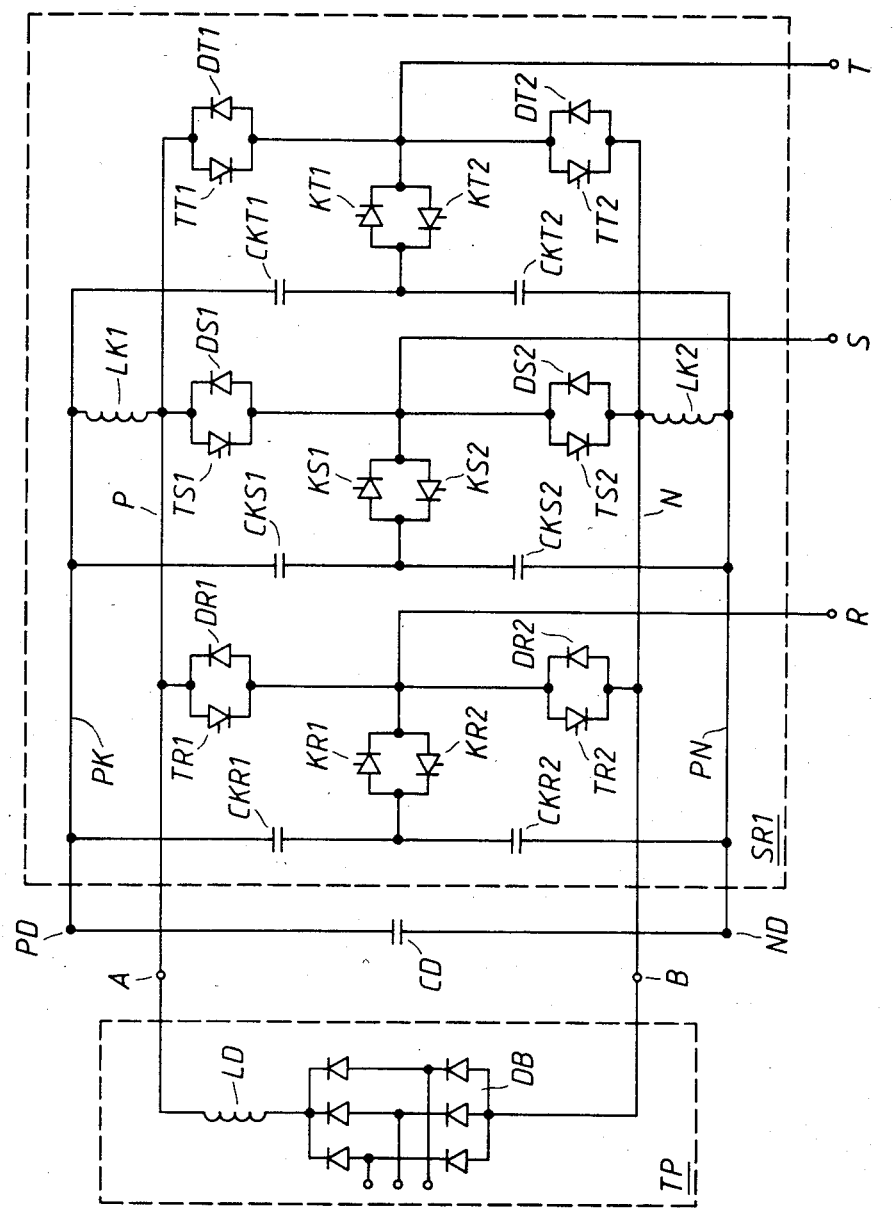
FIG. 5 shows a further embodiment of a convertor means according to the invention and incorporating an inverter having separate commutating capacitors for each phase group.

FIG. 5 illustrates the invention as applied to convertor means which is constructed substantially as the one shown in FIG. 2 but in which in the inverter SR1 each phase group is provided with separate commutating capacitors. Each phase group has two series-connected commutating capacitors, for example CKR1 and CKR2 for the phase group R, which are connected between two busbars PK and NK. In this case the commutating inductor LK1 is connected between the d.c. voltage terminal PD and the busbar P and the commutating inductor LK2 between the d.c. voltage terminal ND and the busbar N. The same advantages are obtained in this csase, namely that the load current will not traverse the commutating inductors, whereby the losses of the convertor means are greatly reduced.

Figure 6:
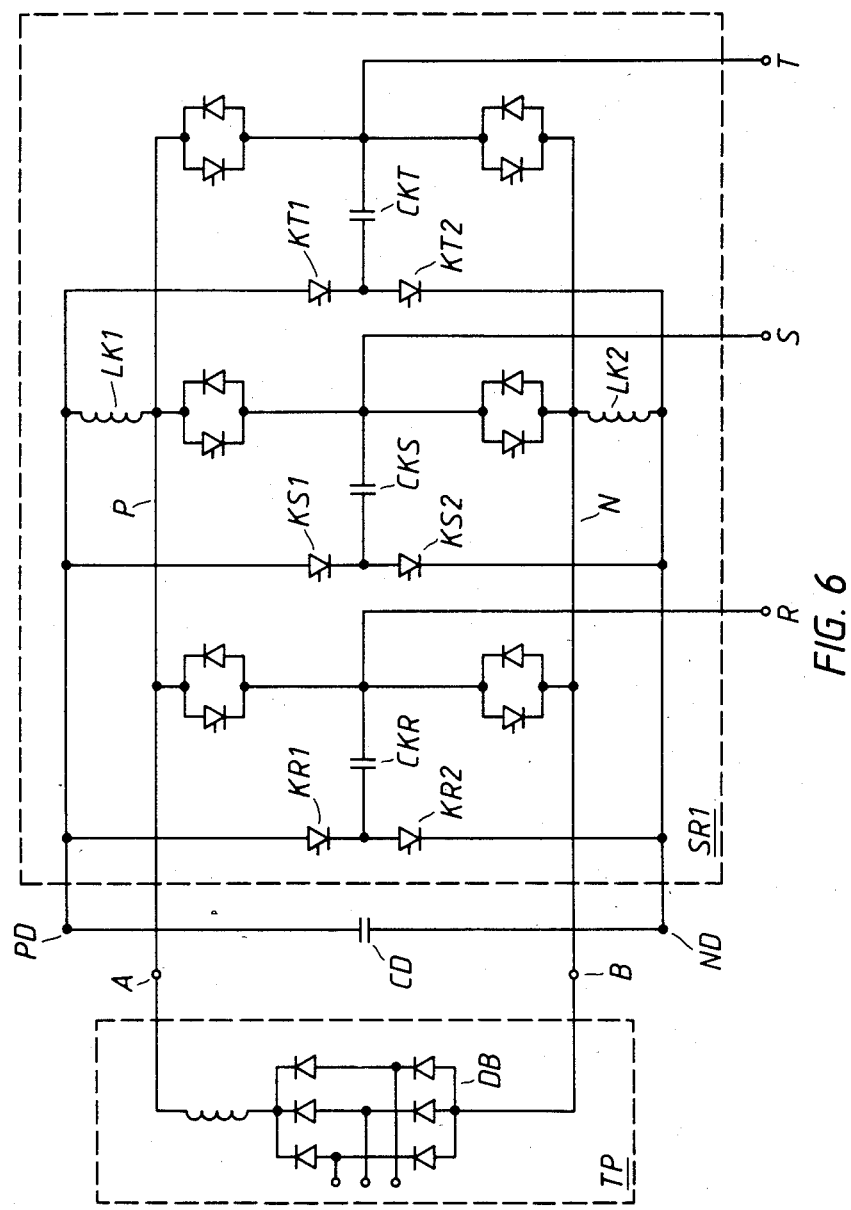
FIG. 6 shows a yet further embodiment of a convertor means according to the invention and having a different variant of inverter provided with separate commutating capacitors for each phase group.

FIG. 6 shows the invention as applied to a convertor means in which the convertor SR1, in the same way as the one shown in FIG. 5, is provided with separate commutating capacitors for each phase group. In this case, the two commutating thyristors in each phase group, for example thyristors KR1 and KR2, are series-connected to each other and connected to the direct voltage terminals PD and ND of the convertor. The commutating capacitor, for example capacitor CKR, in each phase group is connected between the point of connection of the commutating thyristors and the phase terminal. The same advantages are obtained as with the convertor means shown in FIG. 5.

The embodiments described above are only examples and other embodiments of the convertor means are feasible within the scope of the invention.

For example, "the first convertor" (SR1) and its commutating circuit can be constructed in other ways to those described above. Furthermore, the anti-parallel connections of a thyristor and a diode in each phase group can be replaced by other components, for example so-called reverse conducting thyristors. Similarly, the inductive two-terminal network (TP) may consist of different active or passive components from those in the examples shown above (a convertor with a smoothing inductor and a tuned filter, respectively). In those cases where the two-terminal network (TP) consists of a convertor with a smoothing inductor, the smoothing inductor can either, as described above, be placed in the d.c. leads of the convertor or alternatively consist of an inductance or inductor in each one of the a.c. voltage leads of the convertor.

What is claimed is:

1. In a convertor means comprising:
a first convertor including at least two phase groups with forced commutation connected between two busbars;
a series connection comprising a d.c. voltage capacitor connected in series with and between two commutating inductors, common to the phase groups, said series connection being connected between said busbars, each phase group having two series-connected branch portions, the point of connection therebetween constituting a phase terminal of the group, each branch portion comprising a semiconductor means which is controllable in one direction and conducting in the other direction; and
second converter means comprising a second convertor provided with a smoothing inductor being connected to the first convertor for transporting energy between the second convertor means and the first convertor, said second convertor means being connected directly to the busbars.

2. Convertor means according to claim 1, wherein the second converter is a line commutated converter with a.c. terminal means for connection to an a.c. network and d.c. terminal means for connection to the busbars of the first convertor.

3. Convertor means according to claim 2, wherein a smoothing inductor is connected to the d.c. terminal means of the second convertor.

4. Convertor means according to claim 1, wherein each phase group is provided with separate commutating capacitors.

5. Convertor means comprising a convertor including at least two phase groups with forced commutation connected between two busbars, a series connection comprising a d.c. voltage capacitor connected in series with and between two commutating inductors, common to the phase groups, said series connection being connected between said busbars, each phase group having two series-connected branch portions, the point of connection therebetween constituting a phase terminal of the group, each branch portion comprising a semiconductor means which is controllable in one direction and conducting in the other direction, a tuned series filter being connected directly to the busbars of the convertor.

* * * * *